ATOMIC CLOCKS WITH SPIN EXCHANGE COLLISION

Filed July 29, 1966 3 Sheets-Sheet 1

United States Patent Office 3,388,339

Patented June 11, 1968

3,388,339

ATOMIC CLOCKS WITH SPIN EXCHANGE COLLISION

Léon Malnar and Henri Brun, Paris, France, assignors to CSF—Compagnie Generale de Telegraphie Sans Fil, a corporation of France Filed July 29, 1966, Ser. No. 568,959
Claims priority, application France, Aug. 4, 1965, 27,179
6 Claims. (Cl. 331—3)

ABSTRACT OF THE DISCLOSURE

The invention relates to atomic clocks using at least one resonance cell filled with a mixture of two alkali elements. One of said elements is optically pumped by means of a suitable light source and atoms of the other element are aligned by means of a spin exchange collision process occuring within the cell. Means are provided for accurately sensing the frequency of the spectral lines of said other element.

The present invention relates to atomic clocks and more particularly to means used for causing an oscillator to oscillate at a frequency determined by alkali elements which a spin exchange collision process takes place.

In its elementary form, an atomic clock comprises a quartz oscillator whose vibration frequency is controlled by the radio frequency transition characteristic of an optically pumped alkali element. Under the action of a pumping light, the alkali atoms align themselves while absorbing a fraction of the pumped light energy. This alignment is adversely affected by subjecting the atoms to the action of an electromagnetic field, whose frequency corresponds to the radio frequency transition of the alkali element. The antagonistic action of this field increases the absorption capacity of the alkali vapour along an absorption curve plotted as a function of the frequency and having a very pronounced peak which can be very accurately located, but whose position depends on the intensity of the pumping light, which is of course a drawback since the intensity of the pumping light is liable to vary accidentally.

An efficient method for overcoming this drawback consists in optically pumping a first alkali element and then in using the alignment obtained for aligning the atoms of another second element which then serves for detecting the radio frequency transition. By applying this collision technique, the effects of the fluctuations of the pumping light intensity are neutralized. However, in clocks operating in accordance with this technique frequency transitions are subject to the action of the magnetic field intensity. In fact the only transition which is independent of the magnetic field is that between the sub-levels whose magnetic quantum numbers are zero when the ambient magnetic field is weak and which cannot be observed in practice, because there is no population difference between the levels concerned, since the population unbalance takes place through spin exchange collision.

It is an object of the invention to avoid this drawback.

According to the invention there is provided an atomic clock comprising in combination:

At least one resonance cell containing a first alkali element and a second alkali element having a plurality of absorption lines in a predetermined radio frequency band and undergoing with said first element a spin exchange collision; a source of light containing said first alkali element for optically pumping said first element in said cell; means for providing in said cell a D.C. magnetic field of predetermined intensity; at least one photoelectric element positioned for receiving light from said source through said cell; means for generating in said cell an electromagnetic field, frequency modulated in said band; said generating means having an input for controlling the center frequency of said frequency modulated field; and feedback means between said input and said photoelectric element for detecting the resonance frequency of at least one of said lines.

For a better understanding of the invention reference will be made to the drawing accompanying the following description and in which.

Figure 4:
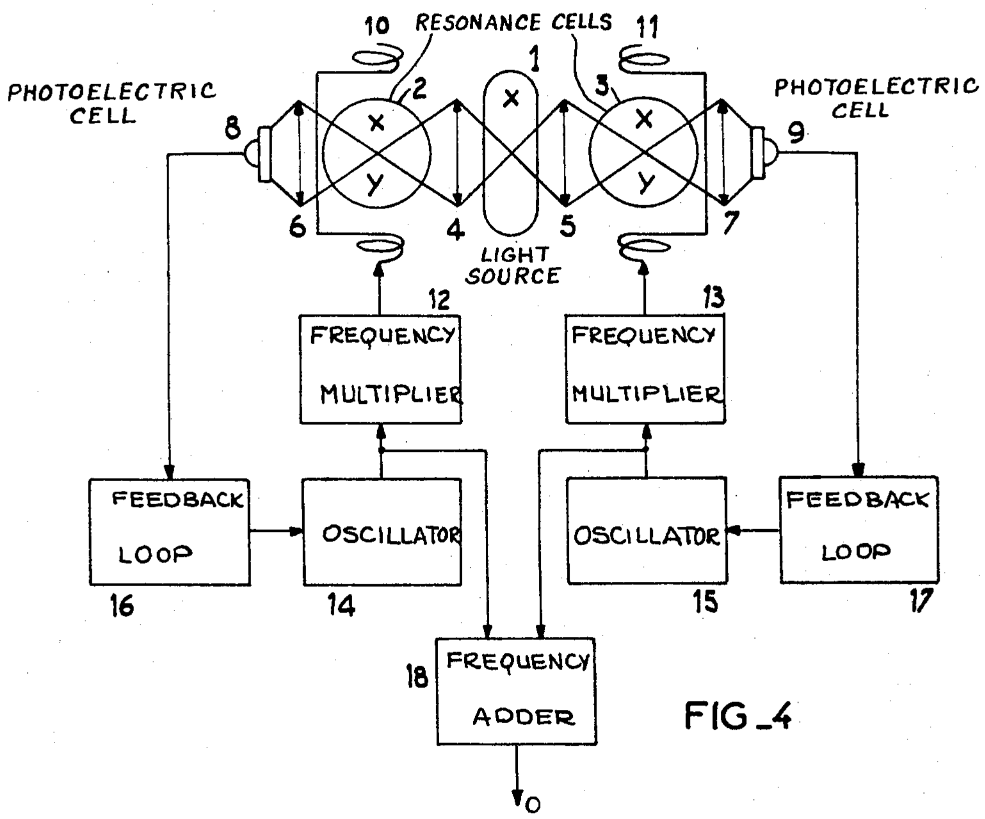
Figure 3:
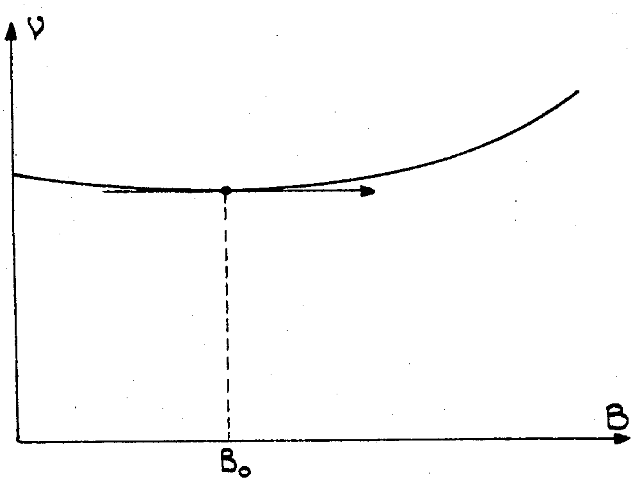
Figure 5:
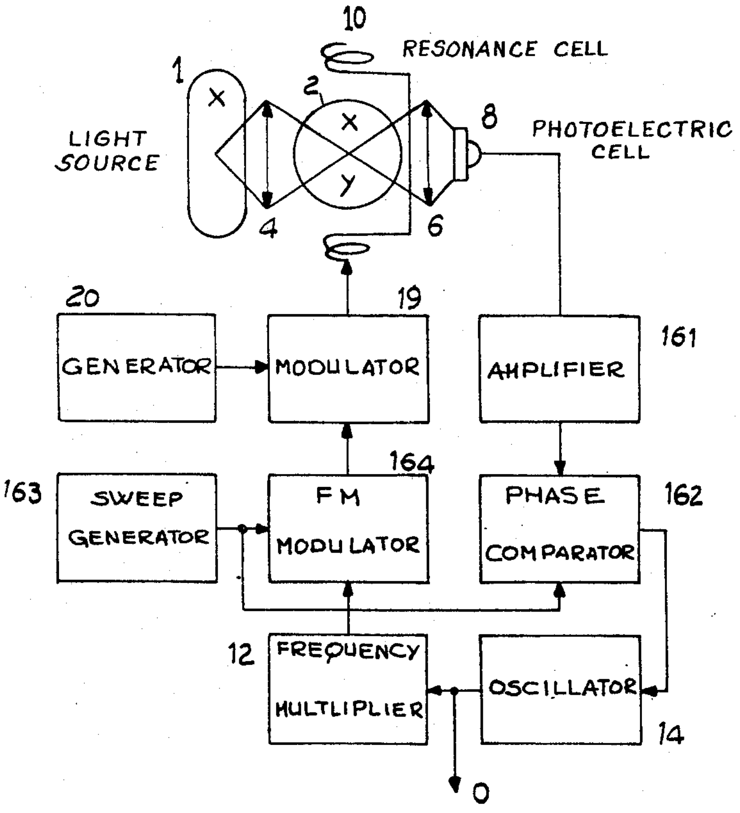
Figure 6:
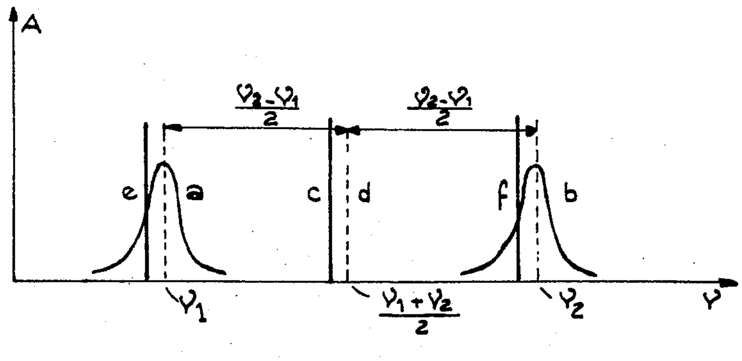

FIG. 3 in an explanatory drawing;

FIG. 4 is a further embodiment of an atomic clock according to the invention;

FIG. 5 shows a still further embodiment of an atomic clock according to the invention; and FIG. 6 is an explanatory diagram.

As already mentioned, in a conventional atomic clock using a resonance cell with only one alkali element such as rubidium, the observed resonance line results from the radio frequency transition taking place between two sub-levels which have been selected for their independance of the magnetic field. The resonance line used is a $0 \rightarrow 0$ line which, undergoes shifts when the pumping intensity fluctuates. The consequence of this shift of the resonance line is a frequency drift of the atomic clock, which is thus caused by a lack of stability of the pumping light-intensity.

In order to overcome this drawback, as already mentioned the analysis of the resonance line of an alkali element Y can be made by aligning the atoms thereof by spin exchange collision with an optically pumped alkali element X. However, this method does not permit the observation of the $0 \rightarrow 0$ transition between the sub-levels with zero magnetic quantum numbers, the only one which does not depend on the magnetic field, this being true only at low intensities.

Figure 1:
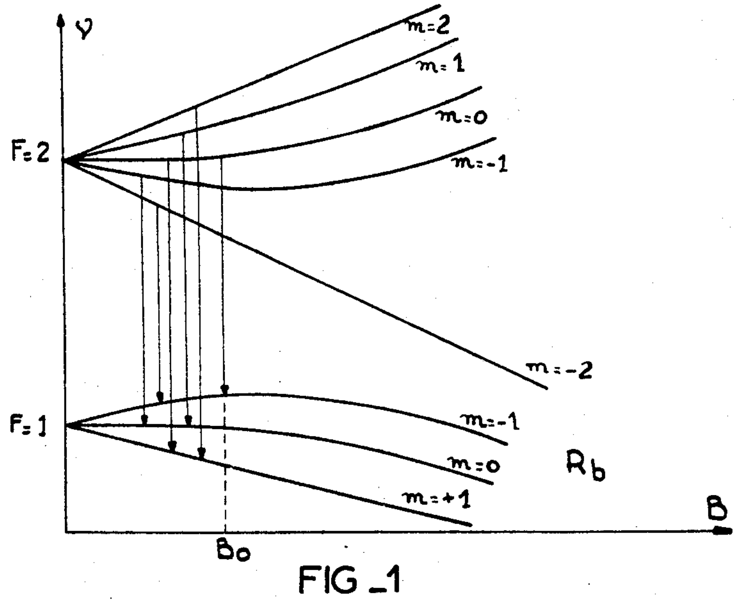
FIG. 1 is an explanatory diagram.

FIG. 1 shows, by way of example, two groups of rubidium sub-levels with the magnetic induction B of the environmental field plotted along the abscissa and the frequencies $\nu$ which serve for measuring the energy gaps between the sub-levels plotted along the ordinate. When the rubidium is aligned by spin exchange collision with another alkali element, the transitions represented by the arrows are observed. The $0 \rightarrow 0$ transition is not observed, but one observes easily the transitions for which $\Delta F=1$ and $\Delta m_F=\pm 1$. It should also be noted that the energy gap between two continuous sub-levels depends on the ambient induction; at low field intensities, the gap varies linearly with the induction.

According to a first embodiment, the spin exchange collision clock has its resonance cell protected from the effects of the ambient magnetic fields. Thus, the transitions $\Delta F=1$ and $\Delta m_F=\pm 1$ have all the same amplitude and merge, the field being zero, with the transition $0 \rightarrow 0$.

Except in the case when the environmental field is zero, the atomic clock frequency is to be controlled by transitions $\Delta F=1$, $\Delta m_F=\pm 1$, which transitions are sensitive to the magnetic field intensity.

Figure 2:
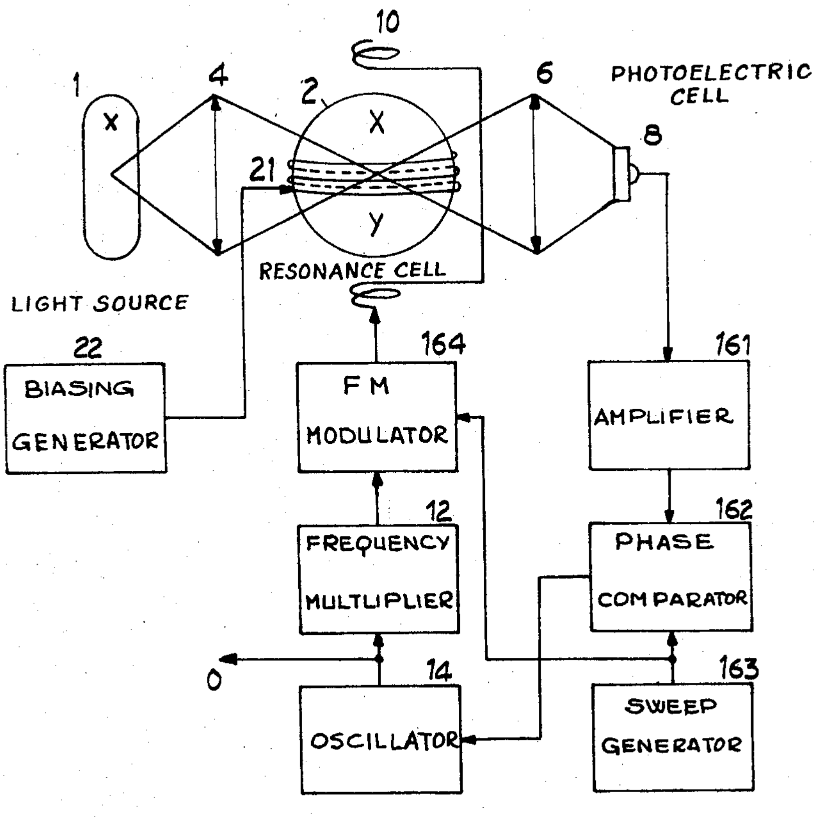
FIG. 2 shows a first embodiment of an atomic clock according to the invention.

FIG. 2 shows a second embodiment of the atomic clock according to the invention. It consists of a source of light containing an alkali element X, for example rubidium, and emitting a light which passes successively through a lens 4, a resonance cell 2 and a lens 6. The light transmitted is received by a photoelectric cell 8 whose output is connected to a feedback loop, comprising an amplifier 161, a phase comparator 162, and a frequency modulator 164. A sweep generator 163 is associated with the modulator 164 and the comparator 162. The resonance cell 2 which contains the alkali elements X and Y, for example potassium, is subjected to the action of a radioelectric field created in a cavity 10 in which the cell 2 is located and which has a central excitation frequency imposed by a quartz oscillator 14 and the frequency multiplication stage 12. An inductor 21 is also provided about the cell 2; it is supplied by a stabilized generator 22 so as to generate in the cell 2 a magnetic field with predetermined magnetic intensity.

Under the action of the polarized light emitted by the source 1, the element X in the cell 2 is aligned and, owing to the spin exchanges by collisions, the element Y is also aligned. Since the element Y is subjected to a predetermined induction $B_0$ by the action of generator 22 and the inductor 21, combined with the action of the environmental magnetic field the energy levels split themselves into sub-levels between which the radiofrequency transitions take place. According to the diagram in FIG. 1, the transition $\Delta F=1$, $\Delta m_F=\pm 1$ which reverses the populations between the sub-levels $F=2$, $m_F=0$, and $F=1$, $m_F=-1$, may be observed.

Considering FIG. 3, the curve embodying the law of the variations of the frequency of the transition $0\rightarrow -1$ as a function of the induction B, it may be seen that there exists a region inside which the variations of this frequency are zero in the first order. For example, for rubidium it may be seen that an induction of 674 Gauss cancels the first derivative of the frequency transition relative to the magnetic induction.

By establishing this particular value of the induction by means of the inductor 21 and its generator 22, the transition $0\rightarrow -1$ of the element Y makes it possible to control the frequency of the oscillator 14. To this end, the signal delivered by the oscillator 14 undergoes successively a frequency multiplication in the frequency multiplier 12 and a frequency modulation by the modulator 164 and its sweep generator 163. In consequence, the electromagnetic field modulates periodically the absorption capacity of the vapour contained in the cell 2 and, after optical detection, the photoelectric cell 8 supplies a signal whose phase is compared with that of the modulating signal coming from the generator 163. The error voltage produced by the comparator 162 controls the frequency of the oscillator 14 so that the same forms an exact submultiple of the frequency corresponding to the transition $0\rightarrow -1$ of the alkali element Y.

FIG. 4 shows a third embodiment of the atomic clock according to the invention; the same references indicate the same parts as in FIG. 2, but for the sake of simplicity the frequency control elements 161, 162, 163, 164, are diagrammatically shown as control loops 16 and 17.

The diagram of the clock is symmetrical and the parts on the right comprise: the lenses 5 and 7, the cell 3, the photoelectric cell 9, the cavity 11, the frequency multiplication stage 13 and a quartz oscillator 15. The outputs of the oscillators 14 and 15 supply a mixer circuit at the output 0 of which the sum of the incident frequencies is obtained.

The alkali element X in the cells 2 and 3 is aligned by the pumped light from the source 1 which also encloses the element X; the element Y contained in the cells 2 and 3 is aligned by spin exchange collision with the element X and, in view the existence of a low intensity ambient magnetic field, the sub-levels of this element split apart. One selects then two radiofrequency transitions of the element Y such that the sum of their own frequencies does not depend on the intensity of the magnetic field; by way of example, one can use the transition $0\rightarrow 1$ and $0\rightarrow -1$, if the element is rubidium. It may be seen from FIG. 1 that these transitions take place between the sub-levels $F=2$, $m=0$ and, on the one hand, $F=1$, $m=+1$ and $F=1$, $m=-1$ on the other, which sub-levels, in a weak field, are located symmetrically relative to the sub-levels $F=1$, $m=0$. Thus, the sum $f_1+f_2$ of the frequencies $f_1$ and $f_2$ corresponding to these transitions does not depend on the intensity of the field and is constant. The oscillator 14, whose frequency $f_1/n$ is controlled by the transition $0\rightarrow 1$ of the element Y in the cell 2, and the oscillator 15, whose frequence $f_2/n$ is controlled by the transition $0\rightarrow -1$ of the element Y in the cell 3, give, at the output of the mixer 18 the frequency $(f_1+f_2)/n$. This does not vary with the intensity of the ambient magnetic field, because the control frequencies of the oscillators 14 and 15 are affected by equal frequency shifts with opposite signs which disappear by the frequency summation.

FIG. 5 shows a fourth embodiment of the atomic clock according to the invention. The same references indicate the same parts as in FIG. 2. Between the modulator 164 and the coils 10, an amplitude modulator 19 has been provided whose modulating input is connected to a generator 20. Contrary to the first three embodiments, which use monochromatic electromagnetic fields, the field generated by the coils 10 shown in FIG. 5, consists of at least two components, whose frequencies $\nu_1$ and $\nu_2$ correspond to two radiofrequency transitions of the element Y, contained in the cell 2.

FIG. 6 shows two absorption lines *a* and *b*, whose maximum valleys correspond, respectively, to the transition frequencies $\nu_1$ and $\nu_2$ of the alkali element Y, aligned by exchange collisions.

Relative to the line *d* which represents the theoretical frequency of the transition $0\rightarrow 0$ in a zero field, the lines *a* and *b* present symmetrical frequency shifts whose amplitudes $(\nu_1-\nu_2)/2$ are linked with the intensity of the magnetic field. If the spectrum of the radioelectric resonance field consists of the lines *e* and *f*, which are the side band frequencies of a signal C, and if the modulating frequency is equal to $(\nu_2-\nu_1)/2$, it may be seen from FIG. 6 that two resonances occur simultaneously. These are at a maximum when the frequency of the signal C coincides with the theoretical transition frequency $0\rightarrow 0$ which is not observable directly.

According to the invention, the quasi-monochromatic signal from the modulator 164 in FIG. 5 undergoes a modulation by means of the modulator 19 and the generator 20. If $\nu$ is the instantaneous value of the frequency of the signal supplied by the modulator 164, and if the generator 20 supplies an amplitude modulating signal whose frequency is $(\nu_2-\nu_1)/2$ correspond to the energy gap between two contiguous sub-levels, the output signal of the modulator 19 comprises the lateral frequencies $$-\frac{\nu_2-\nu_1}{2}$$

and $$+\frac{\nu_2-\nu_1}{2}$$

These frequencies correspond to the lines *e* and *f* in FIG. 6 and are present in the radioelectric resonance field. When $\nu$ coincides with the frequency $(\nu_1+\nu_2)/2$ of the *d* line, one obtains exactly the side band frequencies $\nu_1$ and $\nu_2$ which cause the transitions symmetrical of the transition $0\rightarrow 0$. Thus, the frequency of the oscillator 14 will be locked to the frequency of the transition $0\rightarrow 0$ which is independent of the intensity of the magnetic field.

Without departing from the principle of the invention, the modulator 19 may be made either an amplitude modulator or a frequency modulator. In the former case, one obtains a double resonance; in the latter case, by selecting a suitable modulating index, one obtains a multiple resonance whose components are distributed symmetrically relative to the transition frequency $0\rightarrow 0$.

By way of non-limitative example, the clocks according to the invention may be made with a cesium light source coupled optically with a resonance cell containing a mixture of cesium and rubidium. The rubidium plays the role of the alkali element Y and the radio-frequency transitions of the latter element serve to define the frequency of the clock.

The clocks according to the invention have a frequency which does not depend either on the stability of pumping light intensity or on the intensity of the ambient magnetic field.

Of course, the invention is not limited to the embodiments described and shown which are given solely by way of example.

What is claimed is:

1. An atomic clock comprising in combination: at least one resonance cell containing a first alkali element and a second alkali element having a plurality of absorption lines in a predetermined radiofrequency band and undergoing with said first element a spin exchange collision; a source of light containing said first alkali element for optically pumping said first element in said cell; means for providing in said cell a D.C. magnetic field of predetermined intensity; at least one photoelectric element positioned for receiving light from said source through said cell; means for generating in said cell an electromagnetic field, frequency modulated in said band; said generating means having an input for controlling the center frequency of said frequency modulated field; and feedback means between said input and said photoelectric element for detecting the resonance frequency of at least one of said lines.

2. An atomic clock as claimed in claim 1, wherein said generating means comprise a controlled frequency generator having an output and a control input, a frequency multiplier having an input connected to said output and an output, a frequency modulator and a sweep generator; said frequency modulator having an input coupled to said multiplier output and a modulation input coupled to said sweep generator and an output; a cavity resonator containing said cell and having an input coupled to said frequency modulator output; said feedback means comprising an amplifier coupled to said photoelectric element; a phase comparator having a first input, coupled to said amplifier, a second input, coupled to said sweep generator and an output coupled to said control input.

3. An atomic clock as claimed in claim 1, wherein said magnetic field is a compensating field cancelling out the environmental field inside said cell; said first mentioned means comprising a biasing source feeding an inductor coupled to said cell.

4. An atomic clock as claimed in claim 1, wherein means are provided for adjusting the intensity of said magnetic field in said cell for cancelling the first derivative of said detected resonance frequency with respect to said magnetic field intensity.

5. An atomic clock as claimed in claim 2, wherein a further modulator is inserted between said frequency modulator and said resonator, said further modulator having a modulation input; a signal generator coupled to said modulation input, said generator being tuned to the frequency corresponding to half the frequency interval between two lines between which the frequency drifts take place in response to the variation of said magnetic field intensity.

6. An atomic clock as claimed in claim 1, comprising a further resonance cell containing said first and second alkali elements, a further photoelectric element positioned for receiving light from said source through said further cell; further generating means, coupled to said further cell and having a control input; further feedback means connected between said further photoelectric element and the control input of said further generating means for detecting the resonance frequency of another of said lines whose frequency drift cancels the frequency drift of the resonance frequency of said one line; and means for summing the resonance frequencies of said one and said other detected lines.

References Cited

UNITED STATES PATENTS

| | | | |
|---|---|---|---|
| 3,174,114 | 3/1965 | Arditi | 331—94 X |
| 3,187,251 | 6/1965 | Bell | 331—3 X |

JOHN KOMINISKI, *Acting Primary Examiner.*

S. H. GRIMM, *Assistant Examiner.*

ROY LAKE, *Examiner.*